United States Patent Office 3,020,474
Patented Feb. 6, 1962

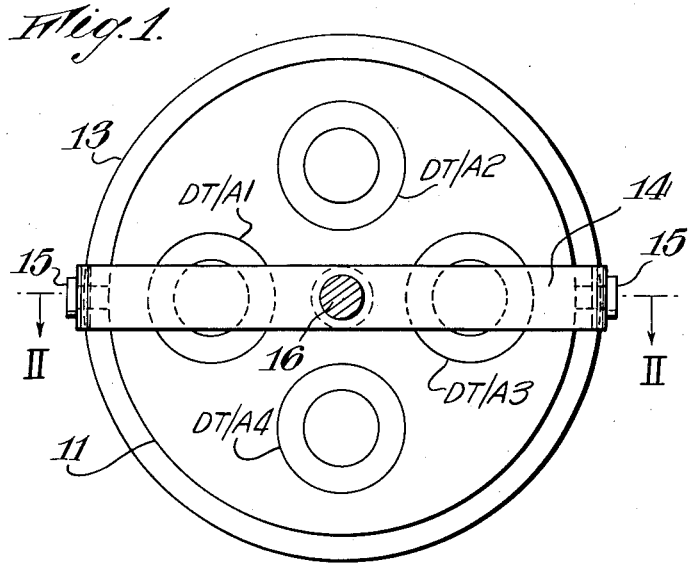
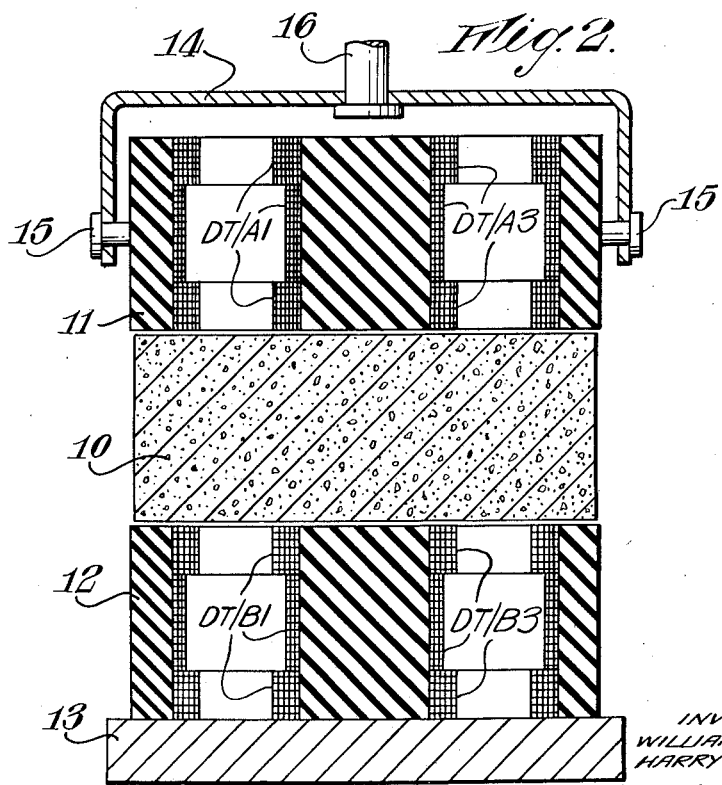

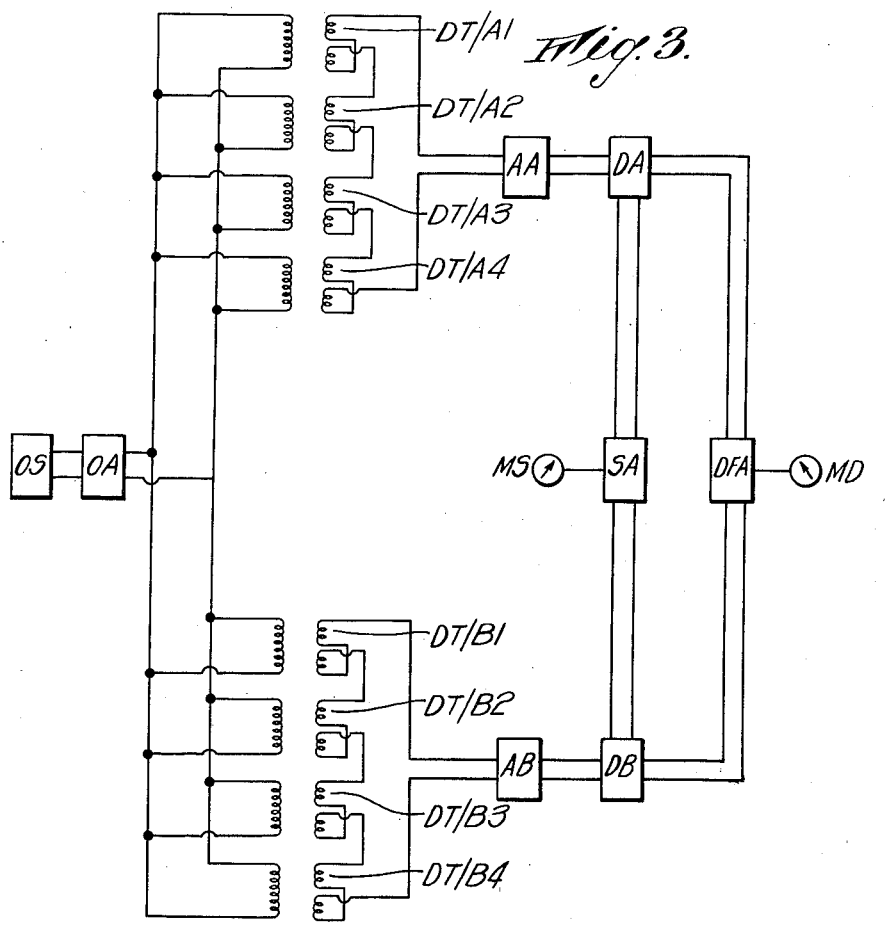

3,020,474
TESTING COMPACTED BODIES OF
MIXED MATERIAL
William Thompson, Lea, Preston, and Harry Nowell,
Marton, Blackpool, England, assignors to United Kingdom Atomic Energy Authority, London, England
Filed Jan. 14, 1959, Ser. No. 786,745
Claims priority, application Great Britain Jan. 15, 1958
2 Claims. (Cl. 324—40)

This invention relates to a method of testing applicable to the control of the manufacture of compacted bodies of mixed material having two constituents, one constituent having a superior electricity conducting property relative to the other. The invention also relates to apparatus for carrying out the above method of testing and is described below in relation to the manufacture of uranium.

In the manufacture of uranium from uranium tetrafluoride using magnesium in the form of raspings as a reducing agent, it is convenient to mix the uranium tetrafluoride and the magnesium raspings in specified quantities and then compress the mixture into pellets. The efficiency of the magnesium reduction process is thought to be dependent upon the degree of mixing of the uranium tetrafluoride and the magnesium raspings in the pellets. The mixing of these materials is a difficult and sensitive process in that the magnesium has a widely differing density from the uranium tetrafluoride and there is a strong tendency for the uranium tetrafluoride, especially when in the form of a free flowing powder, to settle out very easily. It is therefore desirable in a production plant to check the quality of mixing non-destructively, preferably in all the pellets, and to present the results to a plant operator in as short a time as possible so that plant operation can be corrected if necessary.

According to the present invention, a method of testing of the kind described comprises subjecting each body to an alternating electrical field and detecting the magnitude of the eddy currents thereby induced in selected parts of the body.

In a preferred way of carrying the invention into effect, the eddy currents induced in the two ends of the compacted body are detected, and their difference is taken to indicate the quality of mixing and their sum is taken to indicate the proportion of each constituent present.

By way of example, the invention will now be described with reference to the accompanying drawings in which:

FIG. 1 is a plan view, FIG. 2 is a sectional elevation on the line II—II of FIG. 1 and FIG. 3 is a circuit diagram.

Referring to FIGS. 1 and 2, a pellet 10, in the form of a right cylinder four inches in diameter and two inches long, has four differential transformers DT/A.1–4 equi-spaced arounds its top end and four differential transformers DT/B.1–4 equi-spaced around its bottom end. The transformers DT/A.1–4, DT/B.1–4 are mounted in bodies 11, 12 respectively of insulating material. The body 12 is carried on a base plate 13 and the body 11 is pivoted on a support 14 by pins 15. The support 14 is fixed to a slide 16.

Referring to FIG. 3, the eight primary coils of the differential transformers DT/A.1–4 and DT/B.1–4 are fed in parallel from an amplifier OA which is fed from a 2 kc./s. oscillator OS. The four pairs of secondary coils of the differential transformers DT/A.1–4 are connected in series to an amplifier AA which is connected to a detector DA. Similarly, the four pairs of secondary coils of the differential transformers DT/B.1–4 are connected in series to an amplifier AB which is connected to a detector DB. The detectors DA, DB are connected to a summing amplifier SA having a meter MS, and to a difference amplifier DFA having a meter MD.

The circuit thus comprises two coil systems each comprising four differential transformers, DT/A.1–4 and DT/B.1–4 respectively. The output from each coil system is fed to the amplifiers, AA, AB respectively, and then after rectification (at the detectors DA, DB respectively) the two signals are fed to the summing amplifier SA and to the difference amplifier DFA, the outputs being indicated on the meters MS, MD respectively. In use, the body 11 is raised by operating the slide 16, the pellet 10 to be tested is placed between the bodies 11 and 12 and the body 11 closed down on the pellet 10. The sum and difference readings on the meters MS and MD are noted.

For calibration purposes the meter readings obtained for a wide range of pellet compositions are compared with figures obtained by chemical analysis. The method of testing described thus gives a method of control in the manufacture of the pellets, the method of testing being non-destructive and adapted to serve the requirements of a production plant. It would be practical to test all pellets manufactured by automatic feed and operation of the apparatus described above.

We claim:

1. Apparatus for testing the manufacture of a compacted body of mixed material having two constituents, one constituent having a superior electrical conducting property to that of the other, comprising means for supporting a differential transformer at each end of the compacted body, means for feeding alternating current to the primary windings of said differential transformers, means for detecting the output of the secondary windings of said transformers, means for summing the output of the secondary windings of said transformers whereby the proportion of each constituent present is determined, and means for indicating the difference between the outputs from the secondary windings of said transformers whereby the homogeneity of mixing of the two constituents is determined.

2. Apparatus according to claim 1, wherein said supporting means includes two members of insulating material spaced apart to allow introduction of a compacted body between the members, said members being movable together to close the body between the members, and the secondary windings of said transformers are coupled together in two circuits, said secondary windings being coupled additively in one of said circuits and differentially in the other of said circuits.

References Cited in the file of this patent
UNITED STATES PATENTS

| | | |
|---|---|---|
| 1,640,524 | Augustine | Aug. 30, 1927 |
| 2,237,254 | Broekhuysen | Apr. 1, 1941 |
| 2,489,920 | Michel | Nov. 29, 1949 |